United States Patent
Ueyanagi

(10) Patent No.: US 6,704,250 B1
(45) Date of Patent: Mar. 9, 2004

(54) NEAR-FIELD MAGNETO-OPTICAL HEAD HAVING A MAGNETIC SENSOR

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/547,103

(22) Filed: Apr. 11, 2000

(30) Foreign Application Priority Data

Apr. 13, 1999 (JP) ............................................ 11-105564
Jun. 22, 1999 (JP) ............................................ 11-175261

(51) Int. Cl.[7] ............................................ G11B 11/00
(52) U.S. Cl. .................................. 369/13.33; 369/13.13
(58) Field of Search ........................... 369/13.33, 13.17, 369/13.32, 13.15, 112.01, 112.23, 112.24, 112.15, 13.13, 118; 359/819, 823, 824; 385/124

(56) References Cited

U.S. PATENT DOCUMENTS

| 5,793,407 | A | | 8/1998 | Park et al. |
| 5,883,872 | A | | 3/1999 | Kino |
| 6,154,326 | A | * | 11/2000 | Ueyanagi et al. ............ 359/819 |
| 6,320,708 | B1 | * | 11/2001 | Ueyanagi et al. ............ 359/824 |
| 6,320,841 | B1 | * | 11/2001 | Watanabe et al. ............ 369/300 |
| 6,396,776 | B1 | * | 5/2002 | Ueyanagi ................. 369/13.33 |

FOREIGN PATENT DOCUMENTS

| JP | 11-31342 a | * | 2/1999 | .............. 369/13.13 |
| JP | 2000-298802 A | * | 10/2000 | .............. 369/13.13 |

OTHER PUBLICATIONS

*Nikkei Electronics*, No. 734, pp. 35–42, Jan. 11, 1999.
H. Kubota et al., *Optics*, pp. 282–285; Aug. 31, 1964—1st ed.; Mar. 20, 1978—9th ed.
M. Onoue et al., *Optical Disk Technology*, pp. 94–97; Feb. 10, 1989.
C.W. Lee et al., *Feasibility Study on Near field Optical Memory Using A Catadioptric optical System*, Optical Data Storage Meeting, 1998.
H. Kubota et al., *Optics*, pp. 282–285.
M. Onoue et al., *Optical Disk Technology*, pp. 94–97.

\* cited by examiner

*Primary Examiner*—Tan Dinh
(74) *Attorney, Agent, or Firm*—Oliff & Berridge, PLC

(57) ABSTRACT

The present invention provides a recording/reproducing head, a recording/reproducing disk, and a recording/reproducing disk apparatus that are capable of high density recording, cost reduction, easy tracking control, and high speed seek operation. A collimated beam that is incident onto an incident surface of a transparent condensing medium is reflected on a reflecting film formed on the surface of a reflecting surface to condense on a second surface, and a beam spot is formed near the end of the second surface. The beam condensed on the beam spot leaks as a near field wave and is propagated to a magneto-optic recording film of a recording/reproducing disk, and information is OAM-recorded cooperatively with the magnetic field of a coil. In reproduction of the information, a leakage magnetic flux that comes from the recording film is detected by a magnetic sensor.

23 Claims, 14 Drawing Sheets

NEAR-FIELD MAGNETO-OPTICAL HEAD HAVING A MAGNETIC SENSOR

BACKGROUND OF THE INVENTION

1. Field of the Invention

This invention relates to a recording/reproducing head, a recording/reproducing disk, and a recording/reproducing disk apparatus that employ the optically assisted magnetic (OAM) recording system that records information on a magnetic recording film or a magneto-optic recording film by means of a magnetic field and a beam spot and reproduces the information by means of a magnetic head, and relates more particularly to a recording/reproducing head, a recording/reproducing disk, and a recording/reproducing disk apparatus that realize high density recording, reduced cost, easy tracking control, and high speed seek operation.

2. Description of the Related Art

In the field of the hard disk drive (HDD) that is used for recording/reproducing data on a magnetic recording film by means of a magnetic head, the magnetic resistive sensor that utilizes the magnetic resistive effect for reproduction, namely the MR (Magnetoresistive) sensor as well as the high-sensitivity high-resolution GMR (Giant-magnetoresistive) sensor, have been developed (sensors including these sensors are termed collectively as magnetic sensor hereinafter), and as the result the recording density has been increased approximately 60% each year for recent several years. However, the limitation of surface density of approximately 30 Gbits/inch$^2$ due to the Super Paramagnetic effect, namely the effect that the magnetization direction of a magnetic domain is reversed by the adjacent magnetization in the opposite direction based on the thermal fluctuation, has been revealed.

To solve the problem, OAM (Optically Assisted Magnetic) recording system has been proposed. This system involves a method in which the data is recorded on a magnetic recording film or a magneto-optic recording film by means of a magnetic field and a beam spot and the data is reproduced by means of a magnetic sensor such as a GMR sensor, wherein the magnetic film is heated by laser beam irradiation during recording and the data is recorded on the portion of the film where the magnetization magnitude is reduced. This system realizes the recording on a high magnetization magnetic film and prevents the flux reversal. An example of such a conventional recording/reproducing disk apparatus that employs the OAM recording system is described in a literature "Nikkei Electronics No. 734 (Jan. 11, 1999) p35".

FIG. 20 shows such a recording/reproducing disk apparatus. The recording/reproducing disk apparatus 1 is provided with a semiconductor laser 2 for emitting a laser beam 3, a polarized beam splitter 33 for separating the laser beam 3 emitted from the semiconductor laser 2 and the reflected beam from a recording/reproducing disk 21, a quarter wave plate 34 for converting the laser beam 3 from the semiconductor laser 2 to a circularly polarized beam, a condense lens 4' for condensing the laser beam 3 from the semiconductor laser 2 that has passed through the polarized beam splitter 33 and the quarter wave plate 34, a semispherical SIL (Solid Immersion Lens) 5 for forming a beam spot 9a on a condensed surface 5b by condensing the laser beam 3 from the beam-condense lens 4' incident from a semispherical incident surface 5a, a slider 31 for holding the SIL 5, a magnetic field modulation coil 10 provided, on the periphery of the beam spot 9a of the slider 31, and a magnetic sensor 11 having a GRM sensor.

When information is to be recorded by use of the apparatus 1 having the structure as described hereinabove, tracking is carried out based on the tracking mark (the term includes tracking groove in the present specification) for the beam spot formed on a recording/reproducing disk 8 to form a beam spot 9a on the condense surface 5b of the SIL 5, and then the near field wave 9b that leaks from the above-mentioned beam-condensed surface 5b is irradiated onto the magneto-optic recording film 8a on the recording/reproducing disk 8 to heat the film 8a and the information is recorded while the magnetic field is being modulated by means of the coil 10. In the case of the condensation by means of the SIL 5, though the near field wave is termed as the pseudo near field wave to discriminate it from the true near field wave because the transmitted beam and the near field wave are mixed near the condense surface 5b, these beams are not discriminated herein and they are referred as near field wave collectively because the near field wave plays a substantial role in condensation and the near field wave is used within a distance shorter than a fraction of the wavelength of the leakage beam. When the information is to be reproduced, tracking is carried out by use of the magnetic sensor based on the tracking marks formed on the recording/reproducing disk 8, that is, reproduction of the information is carried out by means of the magnetic sensor. According to the apparatus 1, the beam spot 9a can be fined in inversely proportional to the refractive index of the SIL 5, and minute recording magnetic domains having a width of approximately 0.3 micron are formed and high density recording is implemented.

However, according to the conventional recording/reproducing disk apparatus, because the tracking marks for the beam spot and the tracking marks for the magnetic sensor are formed respectively on the recording/reproducing disk, the recording density is restricted. Further, when additional fabrication processes for forming 2 kinds of tracking marks are needed, the conventional recording/reproducing disk apparatus results in higher cost.

The conventional recording/reproducing disk apparatus is disadvantageous in that the control system become complex when the tracking control is carried out by use of the tracking marks for the beam spot during recording and the tracking control is carried out by use of the tracking marks for the magnetic sensor during reproduction.

The tracking by use of the magnetic sensor is disadvantageous in that it is difficult to form a highly accurate tracking marks and to track the marks highly accurately due to leakage magnetic flux on the head side surface.

Further, because it is not considered that the track for beam spot tracking and the track for magnetic sensor tracking are closely formed, the seek operation between these two kinds of tracks is required for the transition from recording to reproduction (verify) and from reproduction to recording (correction and re-recording).

Another aspect of the disadvantage of the conventional recording/reproducing disk apparatus is caused from using an air-core coil for the magnetic modulation. The size of the coil should be minimized to be mounted on an optical head which is also minimized for the high density and high speed recording. However, to obtain the magnetic intensity required for recording, the number of turns of the coil should be increased, which causes the increase of the inductance, then the high speed modulation and the transfer rate is restricted. On the contrary, limiting the number of turns causes the insufficiency of the magnetic intensity, then the OAM is hardly carried out stably.

SUMMARY OF THE INVENTION

The present invention has been made in view of the above circumstances and provides a recording/reproducing head, a recording/reproducing disk, and a recording/reproducing disk apparatus which are capable of high density recording, cost reduction, easy tracking control, and high speed seek operation.

The present invention also provides a recording/reproducing head, and a recording/reproducing disk apparatus which are capable of high transfer rate and stable OAM recording.

According to the present invention, the recording/reproducing head and a recording/reproducing disk apparatus includes a laser beam emitting unit that emits a laser beam, a transparent condensing medium having a first surface which condenses the laser beam emitted from the laser beam emitting unit and a second surface on which the laser beam is condensed by the first surface as a beam spot near an end of the second surface, and a magnetic sensor disposed close to the end of the second surface, which detects an incident magnetic field.

With the above structure, the beam spot is formed near the end of the second surface of the transparent condensing medium, and therefore it is possible to shorten the distance between the beam spot and the magnetic sensor. As the result, tracking during recording and reproduction, it is possible to make the magnetic sensor to trace the track by the tracking of the optical sensor. Thus high speed seek operation is implemented.

The present invention further provides a recording/reproducing disk that is capable of optically assisted recording in which information is recorded by means of application of a magnetic field and irradiation of a near field wave spot and the information is reproduced by a magnetic sensor. Tracking marks for the near field wave spot are provided to be used in the recording and the reproduction.

With the above structure, the recording track can be increased because the tracking marks for the magnetic sensor is not provided, and thus the high recording density is implemented.

The present invention further provides a recording/reproducing disk apparatus having a recording/reproducing head that records information by means of application of a magnetic field and irradiation of a near field wave on a recording/reproducing disk and reproduces the information by a magnetic sensor. The apparatus has a tracking unit that tracks based on the tracking marks for the near field wave spot on the recording/reproducing disk during the recording and the reproduction.

With the above structure, the tracking marks for the magnetic sensor can be omitted because tracking is performed based on the tracking marks for the near field wave spot during recording and reproduction, and as the result the number of recording tracks can be increased and high recording density is implemented.

Another aspect of the present invention further provides a recording/reproducing head including a laser beam emitting unit that emits a laser beam, a transparent condensing medium having a condense surface on which the laser beam is condensed, a coil that applies a magnetic field, disposed near the position on which the beam spot is formed, a shading member with an aperture of a predetermined size disposed on the condense surface at the position where the beam spot is to be formed. The shading member is formed of highly permeable material.

With the above structure, the number of turns of the coil can be reduced, thus the inductance is decreased, then high speed modulation can be performed. At the same time, the magnetic intensity can be improved, then the OAM recording can be performed stably.

BRIEF DESCRIPTION OF THE DRAWINGS

Preferred embodiments of the present invention will be described in detail based on the followings, wherein:

FIGS. 15A and 15B are partial bottom views of the recording/reproducing head of the modified example;

DETAILED DESCRIPTION OF THE PREFERRED EMBODIMENTS

Figure 1:
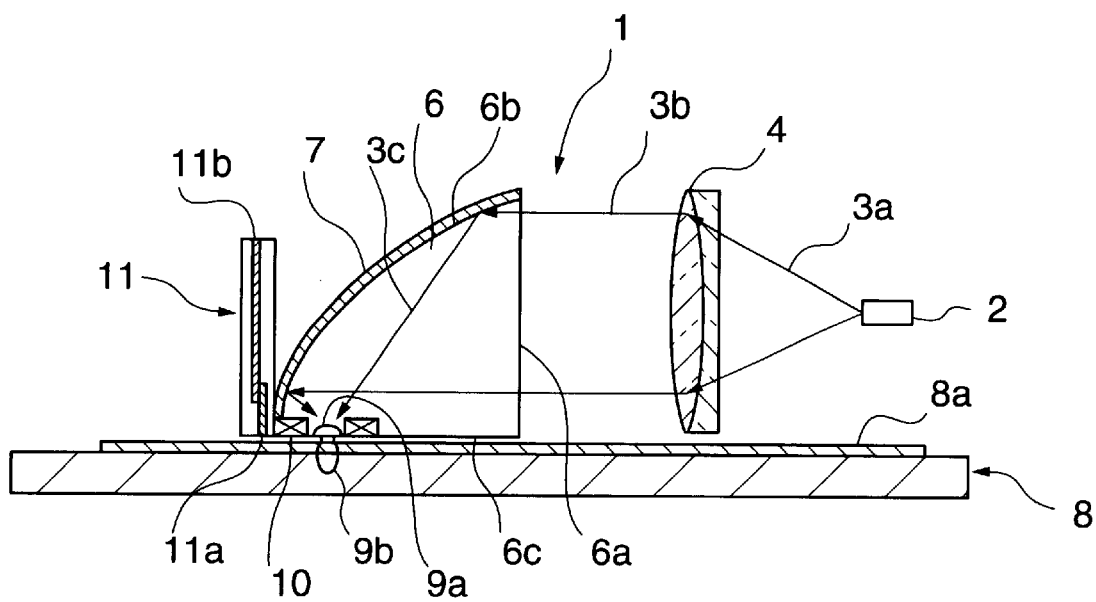
FIG. 1 illustrates a recording/reproducing head in accordance with the first embodiment of the present invention.

In FIG. 1, the recording/reproducing head 1 is provided with a semiconductor laser 2 for emitting a laser beam (emitted beam) 3a, a collimator lens 4 for converting the output beam 3a from the semiconductor laser 2 to a collimated beam 3b, a transparent condensing medium 6 for condensing the collimated beam 3b that is incident from the collimator lens 4 and propagating the condensed beam on the magneto-optic recording film 8a of the recording/reproducing disk 8 as the near field wave 9b, a coil 10 for applying an alternating magnetic field on the recording film 8a on which the near field wave 9b has been propagated for OAM recording, and a magnetic sensor 11 for detecting the leakage magnetic flux from the recording film 8a to reproduce information.

The transparent condensing medium 6 is provided with an incident surface 6a on which the collimated beam 3b from the collimator lens 4 is incident, a reflection surface 6b on which a reflective film 7 is formed, and a condense surface 6c on which the condensed beam 3c from the reflection surface 6b is condensed to form a beam spot 9a.

Figure 2:
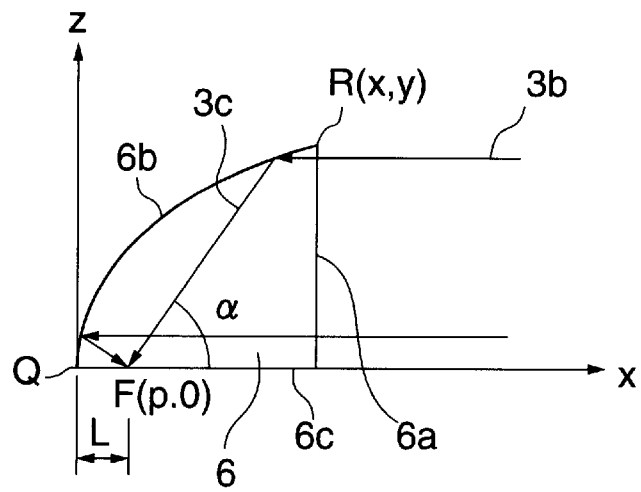
FIG. 2 is a schematic diagram for illustrating a transparent condensing medium of the first embodiment.

FIG. 2 shows the transparent condensing medium 6. The reflecting surface 6b of the transparent condensing medium 6 is formed of a paraboloid of revolution in order to enlarge the condensing angle of the condensed beam 3c in the internal of the transparent condensing medium 6 and in order to form a minute beam spot 9a on the condense surface 6c. As shown in FIG. 2, by setting the principal axis of the paraboloid of revolution to X-axis, the vertical axis to Z-axis, and the coordinate of the focus F to (p, 0), the cross section of the paraboloid of revolution is represented in the next equation.

$$Z^2 = 4px$$

Also, when light is condensed within the transparent condensing medium 6 using a paraboloid, it is possible in principle to perform stigmatic condensing (Optics: Kubota, Iwanami Shoten, Publishers, p. 283), and to condense light on a minute spot 9 using a single condensing surface. In this case, the beam spot size D½ is given by the following equation:

$$D_{1/2} = k \cdot \lambda / (n \cdot NAi)$$

where Nai: Numerical aperture within the transparent condensing medium 6, k: a proportional constant, which is approximately 0.5 for Gaussian beam, $\lambda$: a wavelength of the incident laser beam, n: the refractive index of the transparent condensing medium 6. The portion of the condense surface 6c on which the beam spot 9a is formed may be projected downward, and the coil 10 may be located around the projection. Thereby, the head may be made compact. The projection may be formed of taper shape with the thinner bottom end. Thereby, NA can be doubled.

An MR sensor having a magnetic resistive film 11a with the resistive that varies mainly correspondingly to the magnetic field and an electrode 11b is used as the magnetic sensor 11. The magnetic sensor 11 is located near the vertex Q of the condense surface 6c of the transparent condensing medium 6, and produces the recorded signal by outputting the change of leakage magnetic flux that leaks from the recording mark of the magneto-optic recording film 8a of the recording/reproducing disk 8 as the voltage change Next, the operation of the abovementioned recording/reproducing head 1 is described. When the laser beam 3a is emitted from the semiconductor laser 2, the laser beam 3a is converted to a collimated beam 3b by means of the collimator lens 4, and incident onto the incident surface 6a of the transparent condensing medium 6. The collimated beam 3b incident on the incident surface 6a is reflected on the reflecting film 7 formed on the surface of the reflecting surface 6b and condensed on the condense surface 6c, and the beam spot 9a is formed on the condense surface 6c near the end. The beam condensed on the beam spot 9a leaks as the near field wave 9b and propagates to the magneto-optic recording film 8a of the recording/reproducing disk 8, and OAM recording is carried out in combination with the magnetic field by means of the coil 10. The information is reproduced by detecting the leakage magnetic flux that leaks from the recording film 8a by means of the magnetic sensor 11.

According to the recording/reproducing head 1 having the abovementioned structure, the effect described hereunder is obtained.

(a) The distance L between the vertex Q of the paraboloid of revolution and the beam spot 9a corresponds to the coordinate value p of the focus F, and can be set to a desired value depending on the fabrication accuracy within the range above zero, and it is possible to set the distance L to an approximate value of about 0.1 mm or shorter.

(b) Because the distance L between the vertex Q of the paraboloid of revolution and the beam spot 9a can be set to a short distance, it becomes possible that the both can track a same track from the inside to the outside of the recording/reproducing disk 8.

(c) If the coordinate value p of the focus F of the paraboloid of revolution is about 0.1 mm and the coordinate (x, y) of the top end R of the paraboloid of revolution is (0.9 mm, 0.6 mm), then the condense angle $\alpha$ from the top end is 58 degrees. The condense angle $\alpha$ from the top end R is not limited except the fabrication accuracy within the range of 90 degrees, so the NA of the reflecting surface 6b can be 0.9 or higher.

(d) The product of the refractive index n of the transparent condensing medium 6 and NA is not limited, dielectric material such as $SrTiO_3$ and crystalline material such as GaP that have large refractive index can be used, which makes it possible to reduce the size of the beam spot 9a.

The ellipsoid of revolution may be used for the reflecting surface 6b. A volume hologram or binary hologram may be used as the reflecting film 7.

Figure 3A:
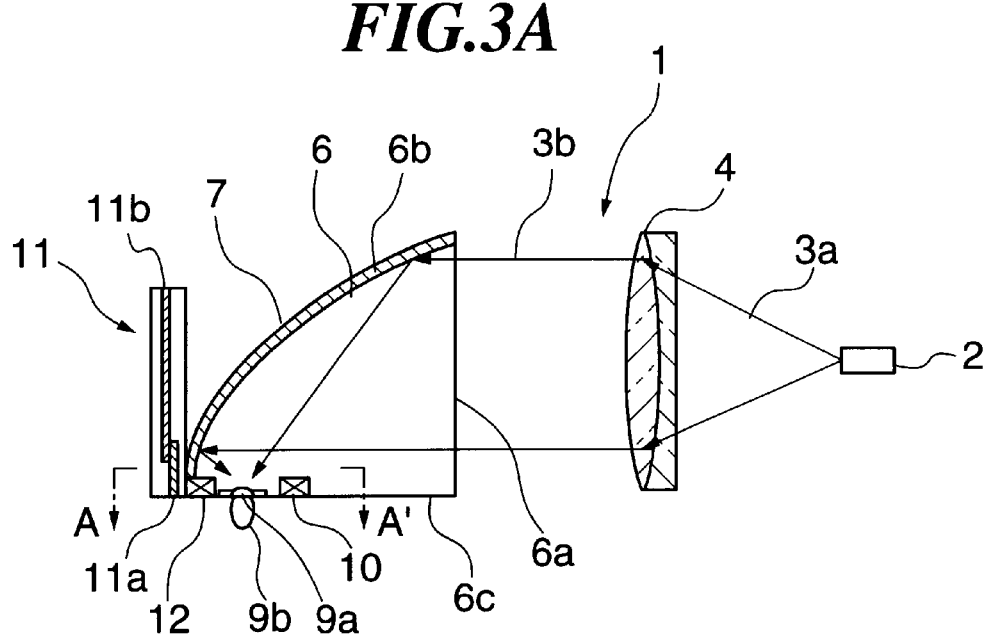
FIG. 3A, FIG. 3B, and FIG. 3C illustrate a recording/reproducing head in accordance with the second embodiment of the present invention.
Figure 3B:
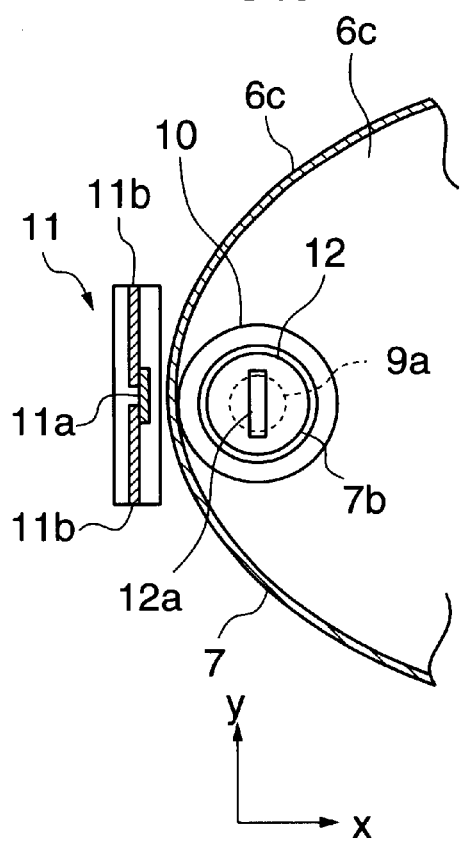
Figure 3C:
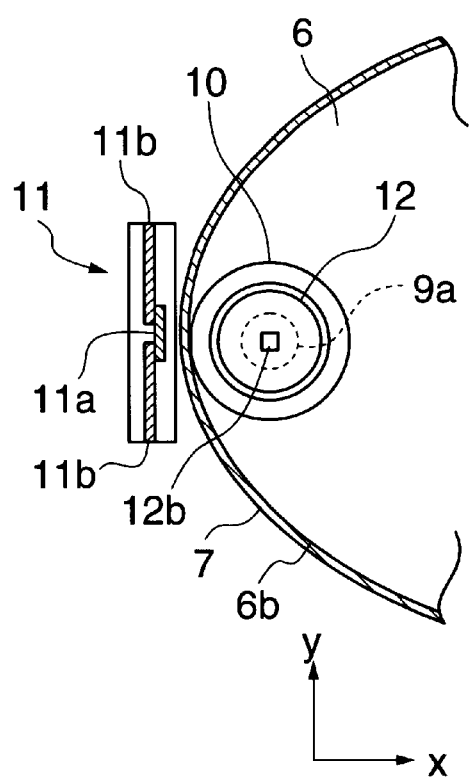

FIG. 3A, FIG. 3B, and FIG. 3C show recording/reproducing heads in accordance with the second embodiment of the present invention. FIG. 3B and FIG. 3C are enlarged view from the A-A' direction in FIG. 3A around the portion on which the beam spot 9a is formed. This recording/reproducing head 1 has the same structure as that of the first embodiment excepting that a shading film 12 having an aperture at the position on the outside surface of the condense surface 6c of the transparent condensing medium 6 so as to shade the beam spot 9a.

In FIG. 3B, a slit 12a provided on the shading film 12 as the aperture is shown. The transverse direction of the slit 12a corresponds to the direction Y orthogonal to the recording track (not shown in the drawing) of the disk recording layer 8a, the width of the slit 12a in this direction is sufficiently larger than the beam spot diameter $D_{1/2}$ and the length in the track direction X is smaller than the beam spot diameter $D_{1/2}$. The size of the near field wave 9b in the track direction X that leaks from the condense surface 6c can be reduced, so the recording density can be increased while the distance between the magnetic sensor 11 and the near field wave 9b is kept short.

In FIG. 3C, a minute rectangular aperture 12b provided on the shading film 12 as the aperture is shown. The sides of the minute aperture 12b are shorter than the beam spot diameter $D_{1/2}$, and one side is formed in the direction Y orthogonal to the recording track (not shown in the drawing) of the recording layer 8a. As described hereinabove, because the distance between the magnetic sensor 11 and the near field wave 9b can be kept short as in the case of the slit 12a and the size of the near field wave 9b in the direction Y orthogonal to the recording track can be minimized, the track width can be made narrow and the recording density is increased more in comparison with the case of the slit.

Figure 4:
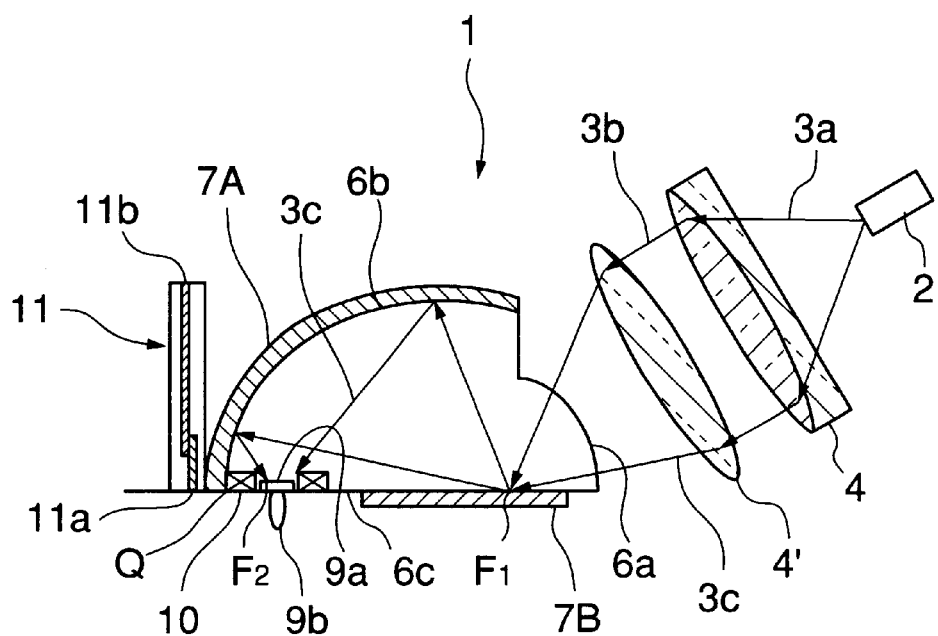
FIG. 4 illustrates a recording/reproducing head in accordance with the third embodiment of the present invention.

FIG. 4 shows a recording/reproducing head in accordance with the third embodiment of the present invention. The recording/reproducing head 1 is provided with a semiconductor laser 2 for emitting a laser beam 3a, a collimator lens 4 for converting the output beam 3a from the semiconductor laser 2 to a collimated beam 3b, a condense lens 4' for condensing the collimated beam 3b from the collimator lens 4, a transparent condensing medium 6 formed in the shape of approximate ellipsoid of revolution on which the laser beam 3c is incident from the condense lens 4', a coil 10 having the same structure as that of the first embodiment, and a magnetic sensor 11.

The transparent condensing medium 6 is provided with an incident surface 6a on which the condensed beam 3c is incident from the condense lens 4', a reflecting surface 6b formed of a portion of the ellipsoid of revolution, and a condense surface 6c having first and second focuses $F_1$ and $F_2$ formed of the ellipsoid of revolution. On the surface of the reflecting surface 6b of the transparent condensing medium 6, a first reflecting film 7A is coated, and a second reflecting film 7B is coated near the first focus $F_1$ on the surface of the condense surface 6c. The incident surface 6a is formed in the shape of spherical surface so as to be orthogonal to the laser beam 3c which condenses to the focus $F_1$, the laser beam 3c is incident on the incident surface 6a without refraction and reflected on the second reflecting film 7B formed on the outside surface of the first focus $F_1$, and then reflected on the first reflecting film 7A formed on the surface of the reflecting surface 6b of the ellipsoid of revolution, condensed to the second focus $F_2$ on the condense surface 6c, and generates the near field wave 9b as in the case of the first embodiment. The cross section of the ellipsoid of revolution is represented by the next equation.

$$x = \frac{a}{2b^2} \cdot y^2 + \frac{a}{8b^4} \cdot y^2 \qquad \text{[Equation 1]}$$

The coordinate of two focuses $F_1$ and $F_2$ is represented by the next equation.

$$(a + \sqrt{a^2 - b^2}, 0), \quad (a - \sqrt{a^2 - b^2}, 0) \qquad \text{[Equation 2]}$$

In these equations, a and b denote the major axis and the minor axis of the ellipsoid of revolution respectively, and the distance between the vertex Q of the ellipsoid of revolution and the second focus $F_2$ is equal to X-coordinate of the second focus $F_2$. Because there are two parameters a and b in the case of the ellipsoid of revolution, the distance between both can be made narrow while NA is kept large. For example, in the case where a=0.6 mm and b=0.3 mm, the distance between the both is about 0.08 mm, so NA of about 0.9 or more can be realized.

Of course, the size of the near field wave 9b can be made smaller by providing a shading film having a slit or a minute aperture on the outside surface near the second focus $F_2$ of the condense surface 6c as in the case of the first embodiment.

Figure 5:
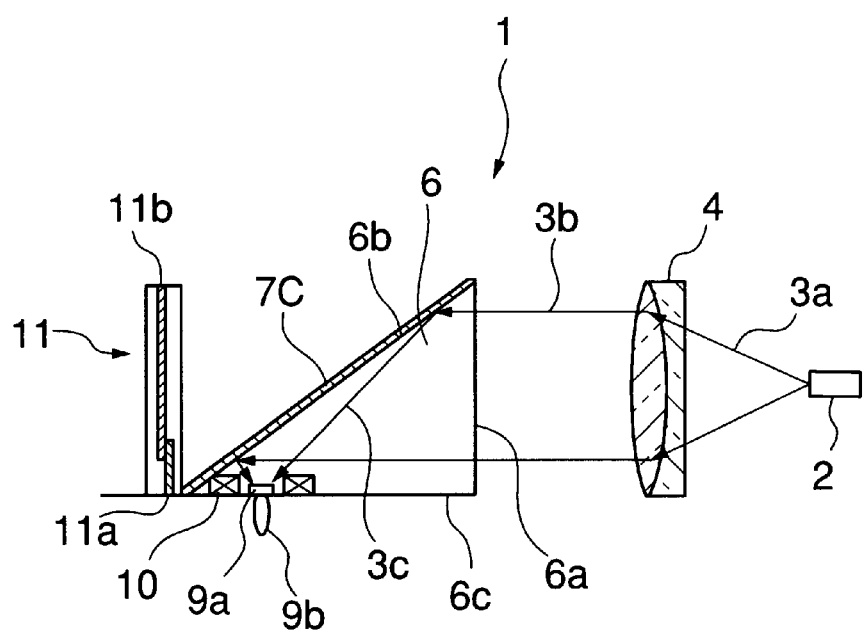
FIG. 5 illustrates a recording/reproducing head in accordance with the fourth embodiment.

FIG. 5 shows a recording/reproducing head in accordance with the fourth embodiment of the present invention. The recording/reproducing head 1 has the same structure as that of the first embodiment excepting that the reflecting surface 6b of the transparent condensing medium 6 is a planer surface and the reflecting film 7 is formed of a reflecting hologram 7C. A volume hologram or binary hologram may be used as the reflection type hologram 7C. It is possible to set the position of the beam spot 9a at the predetermined position by means of a computer in the case of the binary hologram and by introducing an object beam so as to focus at the predetermined position on the condense surface 6c in the case of the volume hologram. Use of the reflection type hologram 7C makes it possible to fabricate the transparent condensing medium 6 easily and to make the distance between the beam spot 9a and the magnetic sensor 11 smaller.

A shading film having a slit or a minute aperture may be provided on the outside surface of the condense surface 6c at the second focus $F_2$ as in the case of the first embodiment. Thereby, the size of the near field wave 9b is made smaller furthermore.

Figure 6:
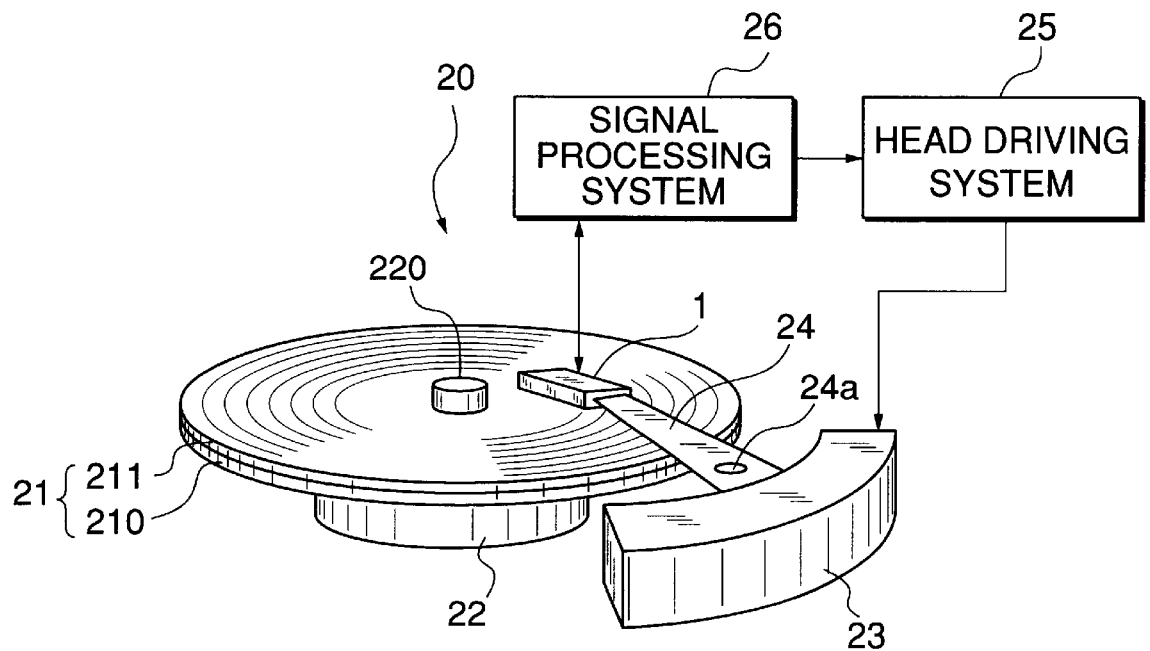
FIG. 6 illustrates a recording/reproducing disk apparatus in accordance with the fifth embodiment of the present invention.

FIG. 6 shows a recording/reproducing disk apparatus in accordance with the fifth embodiment of the present invention. This recording/reproducing disk apparatus 20 is provided with a recording/reproducing disk 21 having a recording layer 211 on one side of a disk-shaped aluminum substrate 210 that is rotated by means of a rotation axis 220 of a motor 22, a recording/reproducing head 1 for performing optical recording on and magnetic reproduction from the recording layer 211 of the recording/reproducing disk 21, a linear motor 23 for driving the recording/reproducing head 1 so as to access and track the recording/reproducing disk 21 from the outside to the inside periphery, a swing arm 24 for supporting the recording/reproducing head 1 from the linear motor 23 side that swings round the fulcrum 24a, a head driving system 25 for driving the recording/reproducing head 1, and a signal processing system 26 for transmitting a laser driving signal to the recording/reproducing head 1 and processing a signal from the recording/reproducing head 1.

Figure 7:
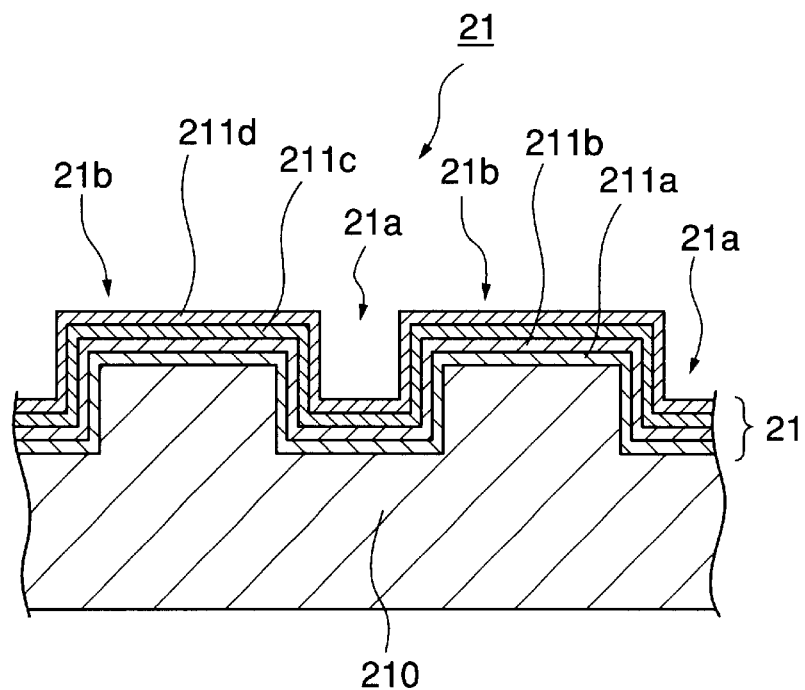
FIG. 7 is a partial cross sectional view of a recording/reproducing disk in accordance with the fifth embodiment of the present invention.

FIG. 7 shows the detail of the recording/reproducing disk 21. An aluminum substrate 210 is used for the recording/reproducing disk 21, and grooves 21 for fabricating the optical tracking and address marks by etching on one side or both sides (FIG. 7 shows an example of one side) is formed. On the substrate 210, a protecting layer 221a of SiNx, a recording layer 221b made of so-called magneto-optic recording film, such as TbFeCo, a TbDyFeCo reading layer 221c that has the large leakage of magnetic flux, and a surface protecting layer 221d are formed one on another. In the present embodiment, the land 21b is used for to the recording track, where the information is recorded. The track width, the track pitch and the depth of the groove section 21a is about 0.2 μm, 0.25 μm and 0.1 μm, respectively. The magnetic field modulation recording is employed for recording, the mark length is about 0.06 μm and the recording density of approximately 40 Gbits/(inch)$^2$ is obtained, which can realize the approximately 40 GB recording capacity for a 3.5-inch disk, which corresponds to the density of four times higher than that of a conventional hard disk.

The groove 21a is formed by etching the substrate 210 in this case, but can be formed by etching an $SiO_2$ film or an SiNx film formed on the substrate 210, or can be formed by press-bonding a film of organic resin such as polycarbonate. Lubricant may be coated on the surface protecting layer 221d. A so-called magneto-optic recording film of material such as TbFeCo is used as the recording layer in the present embodiment, but the material is not limited to TbFeCo, Co—Cr—Ta, which is used for a recording film of a hard disk. The film having strong residual magnetization in an room temperature can be used for recording because the residual magnetization can be reduced by heating with irradiation during recording. A vertical magnetization film made of Co—Cr—Pt may be used. Si or polished polycarbonate substrate may be used instead of aluminum substrate.

Figure 8A:
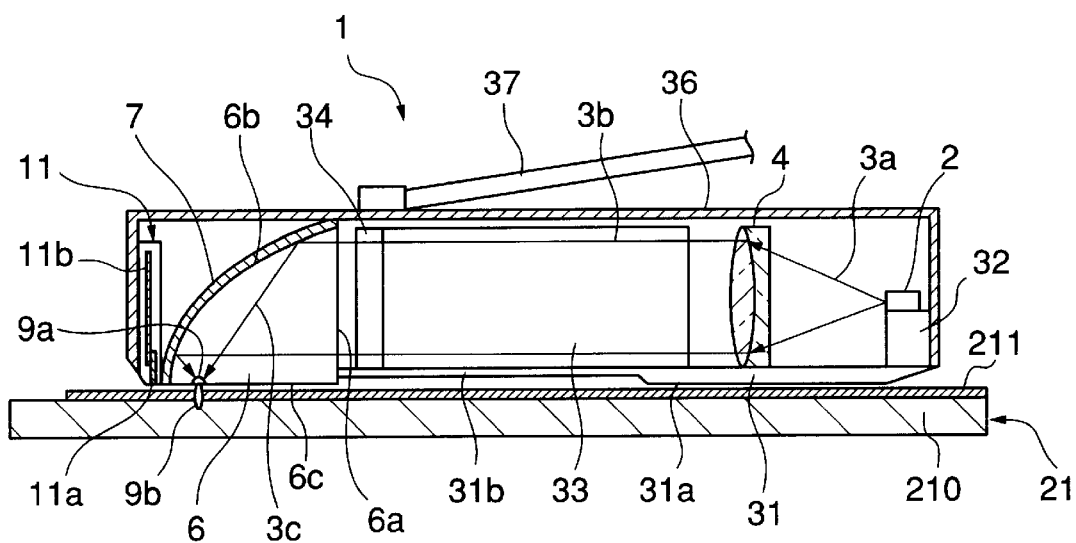
FIG. 8A is a side view of a recording/reproducing head in accordance with the fifth embodiment.
Figure 8B:
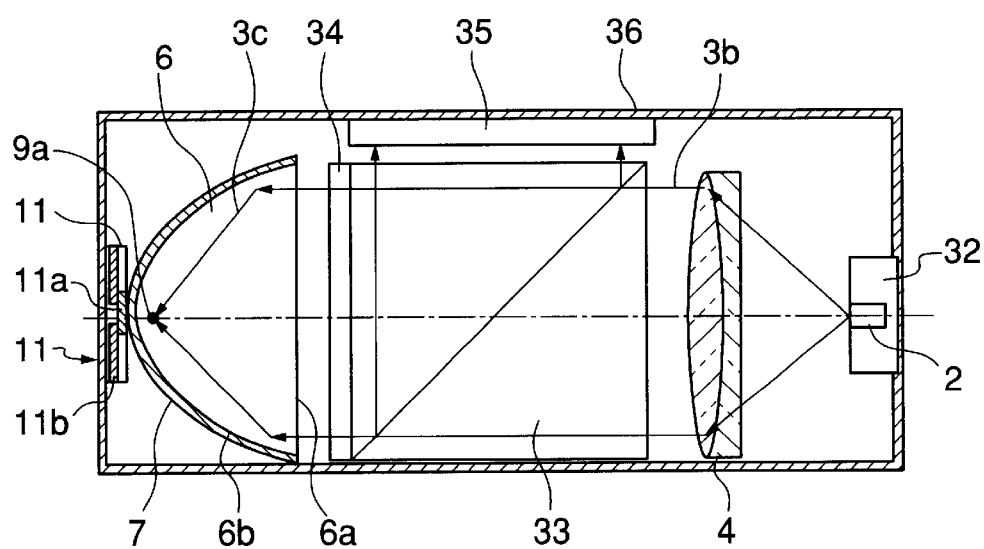
FIG. 8B is a plan view of the recording/reproducing head in accordance with the fifth embodiment.

FIG. 8A and FIG. 8B show a recording/reproducing head 1 in accordance with the fifth embodiment, FIG. 8A is a side view and FIG. 8B is a plan view. The recording/reproducing head 1 has a flying slider 21 that flies above the recording/reproducing disk 31, and provided on the flying slider 31 are an edge emitting semiconductor laser 2 for emitting a laser beam 3a, a collimator lens 4 for converting the laser beam 3a to a collimated beam 3b, a quartz plate 32 for fixing the edge emitting semiconductor laser 2, a polarized beam splitter 33 for separating the collimated beam 3b from the semiconductor laser 2 and a reflected beam from the recording/reproducing disk 21, a quarter wavelength plate 34 for converting the collimated beam 3b from the semiconductor laser 2 into a circularly polarized beam, a transparent condensing medium 6 for condensing the collimated beam 3b, a reflecting film 7 formed by means of vacuum evaporation of metal such as Al on the reflecting surface 6b of the transparent condensing medium 6, an optical detector 35 for receiving the reflected beam from the recording/reproducing disk 21 through the beam splitter 33, and a magnetic sensor 11 for reproducing the magnetic signal from the recording mark of the recording/reproducing disk 21. All components are contained in a head case 36, and the head case 36 is fixed to the swing arm 24 shown in FIG. 6 with a suspension 37.

The transparent condensing medium 6 is made of, for example, dense flint glass having a refractive index n=1.91, and has a height of about 0.6 mm, length of about 0.9 mm, and width of about 1.8 mm. The transparent condensing medium 6 has an incident surface 6a, a reflecting surface 6b, and a condense surface 6c like the transparent condensing medium 6 shown in FIG. 1, FIG. 3, FIG. 4, and FIG. 5, and the condense surface 6c is served as a portion of the flying slider 31. The flying slider 31 has a convex 31a for generating the positive pressure and a concave 31b for generating the negative pressure, and the balance of the both allows the flying height to be maintained at a suitable value of approximately 100 nm or smaller. The flying slider 31 is made of material having the same refractive index as that of the transparent condensing medium 6. The convex 31a on the bottom surface of the flying slider 31 can be served also as the condense surface 6c of the transparent condensing medium 6.

Figure 9:
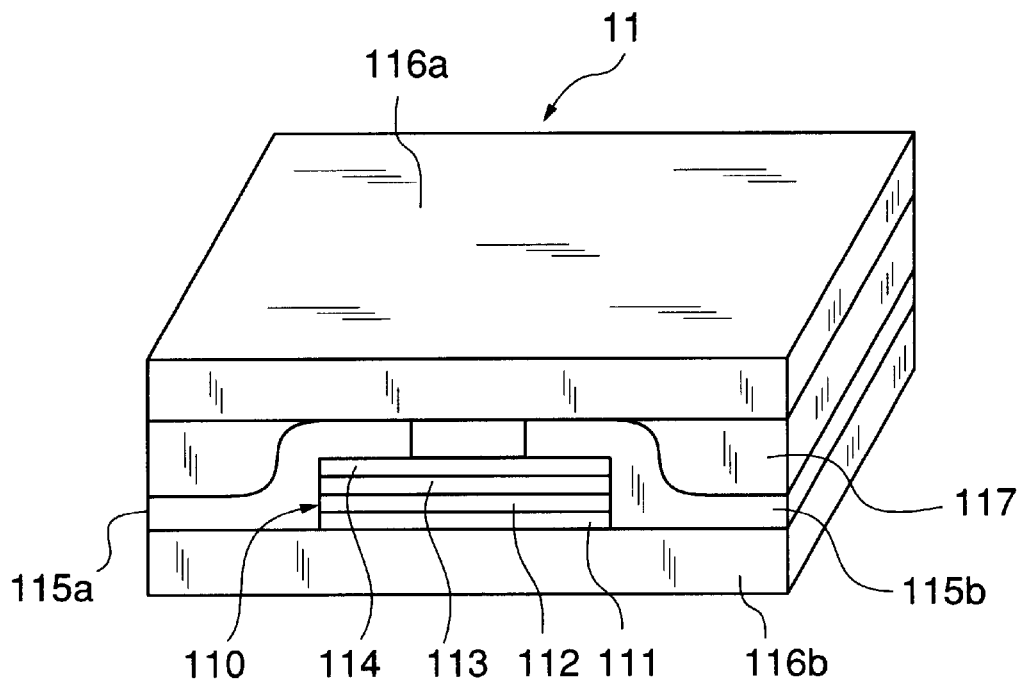
FIG. 9 illustrates a magnetic sensor in accordance with the fifth embodiment.

FIG. 9 shows the magnetic sensor 11 used in the present embodiment. A GMR sensor provided with a GMR film formed of multi-layer film that is called as spin valve is used as the magnetic sensor 11. As shown in FIG. 9, the spin valve 110 has a layered structure, that is, two magnetic layers formed of Ni—Fe namely a pin layer 112 and a free layer 114 are layered with interposition of a non-magnetic layer 113 formed of a metal such as Cu on an antiferromagnetic layer 111 formed of a metal such as Fe—Mn. When the magnetization of the free layer 114 is oriented in the direction of the pin layer 112 by the magnetic field, the spin valve 110 shows low resistivity. When the magnetization of the free layer 114 is oriented oppositely, the spin valve 110 shows high resistivity. The resistivity change is detected as the voltage change applied to electrodes 115a and 115b connected to both ends of the spin valve 110 respectively. 116a and 116b denote magnetic shading films which shade the magnetic field except that from the recorded mark. The sensor length in the track direction is determined by the thickness of the free layer 114, approximately 0.06 μm in the present embodiment. This value is a fraction of the diameter of the near field wave induced area. By use of this sensor 11, it is possible to reproduce the high recording density medium. The width of the sensor 11 is determined by the distance between the electrode 115a and the electrode 115b. In this embodiment, the width is about 0.24 μm, which is about 0.04 μm wider than the track width and slightly narrower than the track pitch. It is possible to reduce the necessary band of the tracking by approximately one order while the crosstalk is avoided.

Figure 10A:
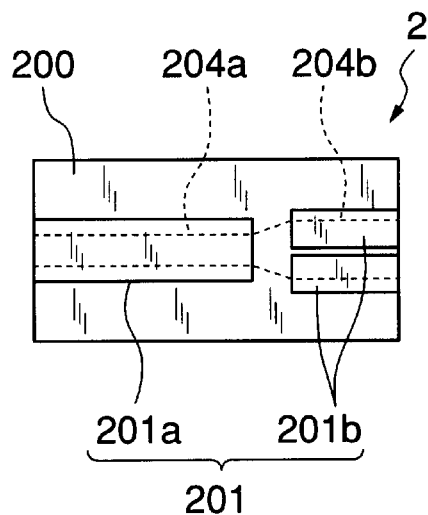
FIG. 10A and FIG. 10B illustrate a semiconductor laser in accordance with the fifth embodiment.
Figure 10B:
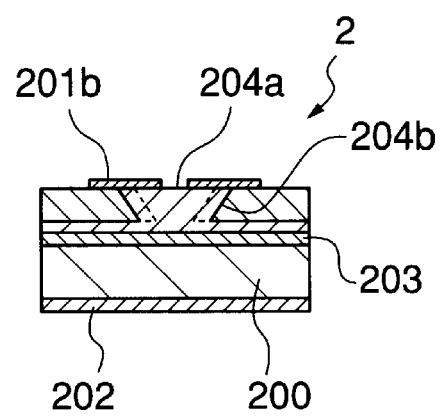

FIG. 10A and FIG. 10B show a semiconductor laser 2 in accordance with the present embodiment. This semiconductor laser 2 is a kind of a beam scannable laser having a substrate 200, a top electrode 201 formed on the top surface of the substrate 200, a bottom electrode 202 formed on the bottom surface of the substrate 200, and an active layer 203 formed in the middle. The width of the main portion 204a and the end 204b of the active layer 203 are about 3 μm and 5 μm respectively, and the length is about 300 μm and 50 μm respectively. The top electrode 201 are divided into a main electrode 201a and a pair of right and left end electrodes 201b and 201b. The output laser beam is scanned to right and left by supplying a current alternately to the end electrodes. The scanning width of 1 μm and the scanning frequency up to 30 MHz are possible for the laser. High frequency tracking is attained using this beam scannable laser.

AlGaInP is used as the material of the active layer 203, and the wavelength is 630 nm. The refractive index and NA of the transparent condensing medium 6 are about 1.91 and 0.85 respectively, and the spot size of the beam spot 9a on the condense surface 6c is approximately 0.2 μm as derived from the equation 1. The near field wave that leaks from the beam spot 9a is irradiated onto the recording layer 211 of the recording/reproducing disk 21 and a current is applied to the coil 10 based on the information signal to thereby perform magnetic field modulation (MFM) recording, and recording with the minimum mark length of about 0.06 μm in the track direction is achieved.

The signal processing system 26 generates an error signal for tracking and a data signal based on the reflected beam from the recording/reproducing disk 21 detected by the optical detector 35, the error signal is divided into a high frequency error signal and a low frequency error signal through a high pass filter and a low pass filter. The head driving system 25 is controlled the tracking with regards to these error signals by the signal processing system. The error signal for tracking is generated by means of the sample servo system (Optical Disk Technology, Radio Gijutsu Co., P. 95), and in the sample servo system, the wobbled mark is provided intermittently on the track, an error signal is generated based on the intensity change of the reflected beam from the track. Tracking control is performed by means of two-step control in which the linear motor 23 for driving the swing arm 24 is controlled based on the low frequency error signal and the beam scanning semiconductor laser 2 is controlled based on the high frequency error signal, and thus the precise tracking that covers from low frequency to high frequency is implemented. Because the recording signal and the tracking error signal are separated time-divisionally in the case of Sample Servo System, the recording signal and tracking error signal are separated by a gate circuit in a reproduction circuit. As described hereinabove, because the recording signal and the error signal are separated time-divisionally by applying the sample servo system, a separation type optical detector is not needed. Furthermore, in the case of the optical sample servo, the servo mark can be formed by pressing. So the servo marks are positioned accurately and can be made efficiently, in comparison with magnetic marking in which the mark is written on each.

The error signal may be generated by push-pull system, which utilize the interference with the reflected beam from the groove 21a. In this case, because the error signal is formed based on the intensity difference between the right and left reflected beams, a two-section type optical detector must be used for the detection.

During reproduction, the resistivity change of the magnetic sensor 11 based on the direction of the leakage magnetic flux from the recording mark is read out as a voltage change by use of the GMR magnetic sensor 11, then a reproduction signal is obtained. The error signal by means of the abovementioned optical detector 35 is used also for tracking control during reproduction. In this case, the laser scanning cannot be used, but because the detection width of the magnetic sensor 11 is about 20% larger than the track width, the necessary servo band width necessary for tracking is reduced by one order of magnitude, and tracking can be performed only by driving the swing arm. Alternatively, high frequency tracking may be performed by attaching a piezo-electric element to the GMR sensor.

Because the error signal is generated by use of the optical detector 35, the beam spot 9a and the magnetic sensor 11 can track simultaneously, verification (verification of the recording) can be performed immediately after recording by reproducing the recorded signal. Contrary to a conventional disk, additional rotation is not required for verification, which reduces the recording time to a half.

Figure 11:
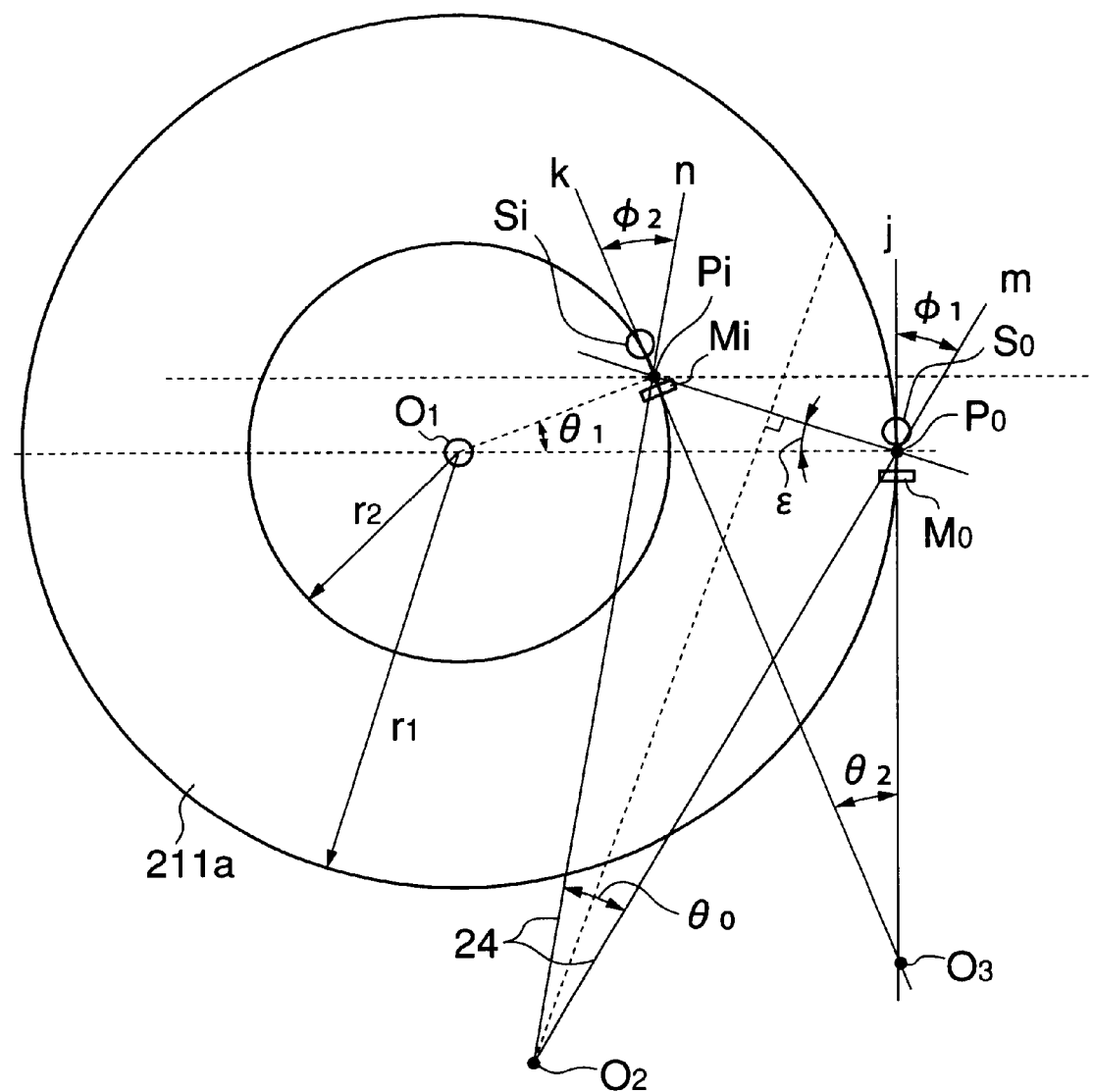
FIG. 11 illustrates a swing arm in accordance with the fifth embodiment.

FIG. 11 shows the basic concept of the swing arm 24. If scanning is performed so that the line j that connects the center So of the beam spot 9a and the center Mo of the magnetic sensor 11 on the outside track 211a and the line k that connects the center Si of the beam spot 9a and the center Mi of the magnetic sensor 11 on the inside the track 211a are maintained parallel to the tangent of the inside and outside circumferences at the center points Po and Pi respectively, the angle $\theta_1$ between the lines from the center $O_1$ of the disk 21 to Po and Pi respectively becames equal to the angle $\theta_2$ between the lines j and k. The rotational center $O_2$ of the swing arm 24 is placed on the bisector of the line between Po and Pi and lines that connect the rotational center $O_2$ of the swing arm 24 to Po and Pi respectively are denoted as m and n, the scanning angle of the swing arm 24 namely the angle $\theta_0$ between the lines m and n is represented by the next equation.

$$\theta_0=\theta_2+\phi_1-\phi_2=\theta_1+\phi_1-\phi_2$$

wherein $\phi_1$ and $\phi_2$ denote the angles of the inside circumference and the outside circumference of the recording/reproducing head 1 to the center axis of the swing arm 24, respectively. For the magnetic sensor 11 and the beam spot 9a tracking on the same track from the inside circumference to the outside circumference, $\phi_1$ must be equal to $\phi_2$, which means the rotational center $O_2$ of the swing arm 24 is placed at the position which satisfies the relation $\theta_1=\theta_2$ as shown above. The abovementioned relation is not limited to one condition. In principle, the value of $\theta_1$ can be selected on the condition that the angle is larger than zero and can range up to the angle that is made when a line connecting Po and Pi coincides with the tangent of the inside circumference. So the value of $\theta_1$ can be selected desirably so as to fit to the scanning angle of the swing arm 24 and the size of the apparatus. If $\theta_1$ is determined, the angles $\phi_1=\phi_2$ made by the recording/reproducing head 1 and the center axis of the swing arm 24 is given by the equation described hereunder by use of the outside radius $r_1$ and the inside radius $r_2$.

$$\phi_1=\phi_2=\xi+\theta_2/2$$

$$\xi=Arctan(r_2 \cdot \sin \theta_2/(r_1-r_2 \cdot \cos \theta_2))$$

wherein $\xi$ is the angle made by lines Po-Pi and Po-$O_1$. In other words, by setting the swing arm 24 and the recording/reproducing head 1 so as to satisfy the abovementioned relation between $\theta_0$, $\theta_1$, and $\phi_1$, $\phi_2$, it is possible for the swing arm 24 to scan so that the beam spot 9a and the magnetic sensor 11 are always traced on the same track regardless of the variable curvature of the outside or the inside circumference.

Next, the operation of the optical disk apparatus 20 is explained. The recording/reproducing disk 21 is rotated at a predetermined rotation speed by the motor 22. The flying slider 31 is filed above the recording/reproducing disk 21 by the positive and negative pressure generated as the result of rotation of the recording/reproducing disk 21 and spring force of the suspension 37, and traced on the predetermined track by the head driving system 25. The laser beam 3a activated by the signal processing system 26 is emitted from the semiconductor laser 2, and is converted to a collimated beam 3b by the collimator lens 4. It passes through the polarized beam splitter 33 and the quarter wavelength plate 34, and is incident on the incident surface 6a of the transparent condensing medium 6. The collimated laser beam 3b is converted to a circularly polarized beam when the beam passes through the quarter wavelength plate 34. The circularly polarized collimated beam that has been incident on the incident surface 6a of the transparent condensing medium 6 is reflected on the reflecting surface 6b and reflecting film 7 coated on the outside surface of the reflecting surface 6b, and is condensed on the condense surface 6c to form the beam spot 9a. The near field wave 9b leaks to the outside of the condense surface 6c from the beam spot 9a, the near field wave 9b is propagated to the recording layer 211 of the recording/reproducing disk 21, and optical recording is carried out. The reflected beam on the recording/reproducing disk 21 returns the way of the incident beam reversely, reflected on the reflecting film 7, reflected at an angle of 90 degrees by the polarized beam splitter 33, and is incident on the optical detector 35. The signal processing system 26 generates a tracking error signal based on the reflected beam from the recording/reproducing disk 21 that has been incident on the optical detector 35 when recording to activate the head driving system 25, controls the laser beam 3a and the swing arm 24 to scan for tracking, and further verifies the recording by use of the reproduced signal from the magnetic sensor 11.

During reproduction, the signal processing system 26 drives the semiconductor laser 2 so as to emit the near field wave 9b having the low intensity so that it is not recorded on the recording layer 211 of the recording/reproducing disk 21, generates the error signal based on the reflected beam from the disk 21, and reproduces the recorded information in the recording layer 211 by means of the magnetic sensor 11.

The recording/reproducing head used in the first embodiment is used as the recording/reproducing head 1 in the present embodiment, but the recording/reproducing head 1 is by no means limited to this recording/reproducing head, and the recording/reproducing head in accordance with the second, third, and fourth embodiments may be used. However, in the case where the minute aperture described in the second embodiment is used, scanning of the laser beam 3a cannot be used for tracking, and in this case, it is required that the recording/reproducing head itself or transparent condensing medium is driven by means of a piezo-electric element.

According to the recording/reproducing disk apparatus 20 having the abovementioned structure, the following effects are obtained.

(a) Because the tracking marks and address marks for the magnetic sensor is not necessary for the recording/reproducing disk 21, high recording density is realized.

(b) Because the GMR magnetic sensor 11 is used for reproduction, the resolution during reproduction is significantly improved, and the significant high density of the recording/reproducing disk 21 is realized.

(c) Because both the beam spot 9a and magnetic sensor 11 always track on the same track and the error signal is generated by use of only the reflected beam from the recording/reproducing disk 21, only an apparatus used for optical reading is required on the recording/reproducing disk 21 and an apparatus used for magnetic reading and the address marks are not required, and thus the high density is realized. As the result, the disk fabrication time is significantly shortened, and the low price is realized.

(d) Because the error signal is formed by use of only the reflected beam from the recording/reproducing disk 21, the mechanism of signal generation used for tracking control is simplified.

(e) Because the beam spot 9a and the magnetic sensor 11 track simultaneously on the same track, the data is reproduced by the magnetic sensor 11 during recording, verification immediately after recording is realized. As the result, the additional rotation for verification is not necessary, and the recording time is shortened.

(f) Because the error signal is generated by use of the reflected beam from the recording/reproducing disk 21 during both recording and reproduction, a high precision tracking error signal is generated.

Figure 12A:
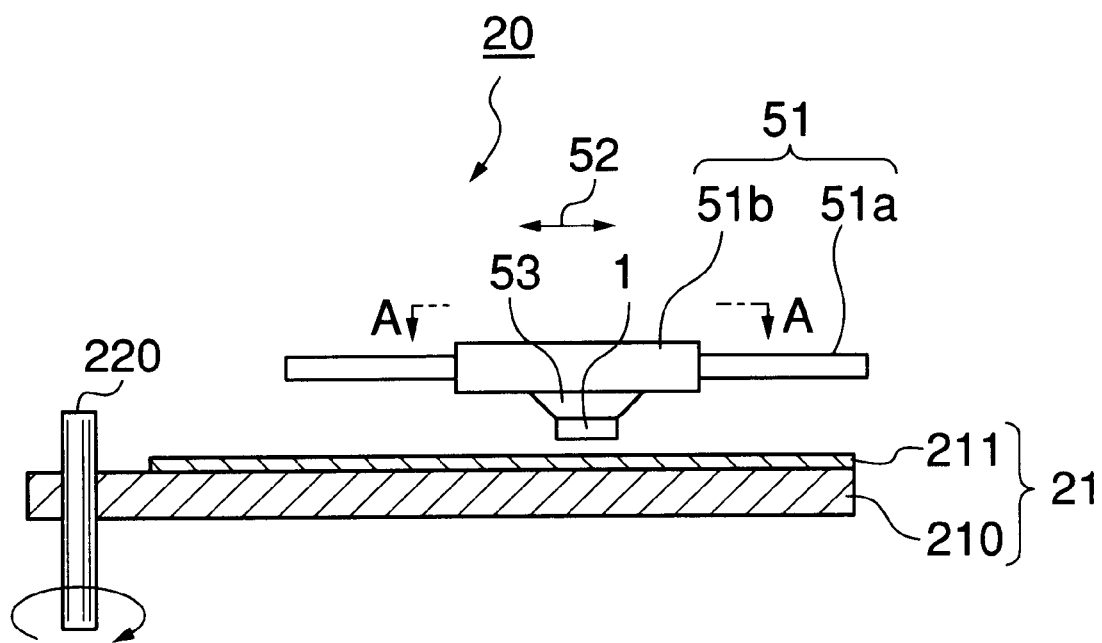
FIG. 12A and FIG. 12B illustrate a recording/reproducing disk apparatus in accordance with the sixth embodiment of the present invention.
Figure 12B:
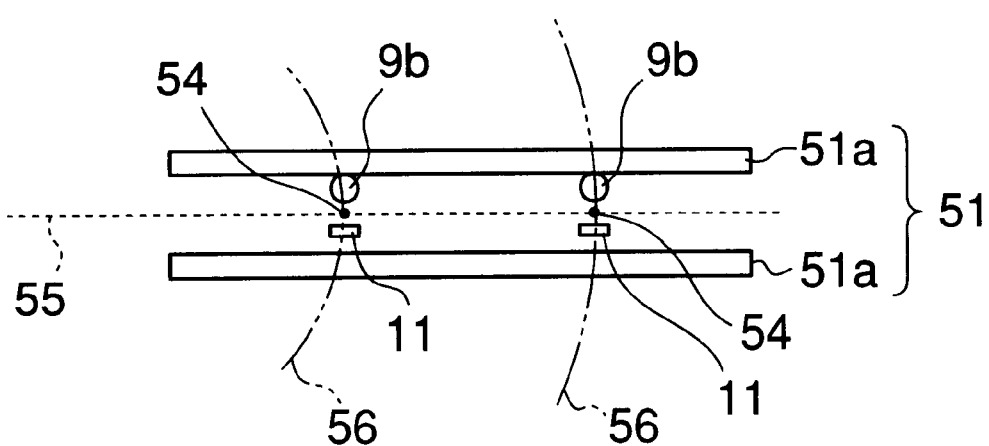

FIG. 12A shows a recording/reproducing disk apparatus 20 in accordance with the sixth embodiment of the present invention, and FIG. 12B shows a partial view viewed from the A-A direction in FIG. 12A. The swing arm 24 is used for seek operation and tracking in the fifth embodiment, instead in the second embodiment a linear motor 51 is used, which is the only difference from the fifth embodiment. The linear motor 51 is provided with a pair of fixed members 51a disposed along the tracking direction 52 and a movable member 51b that moves on the pair of fixed members 51a, and the recording/reproducing head 1 is fixed to the movable coil 51b of the linear motor 51 with interposition of a suspension 53.

The recording/reproducing head 1 is set so that the midpoint 54 of the beam spot 9a and the magnetic sensor 11 scans always on the center axis 55 of the linear motor 51 as shown in FIG. 12B, it is thereby possible that the beam spot 9a and the magnetic sensor 11 always scan on the same track 56 as in the case of the fifth embodiment.

Figure 13:
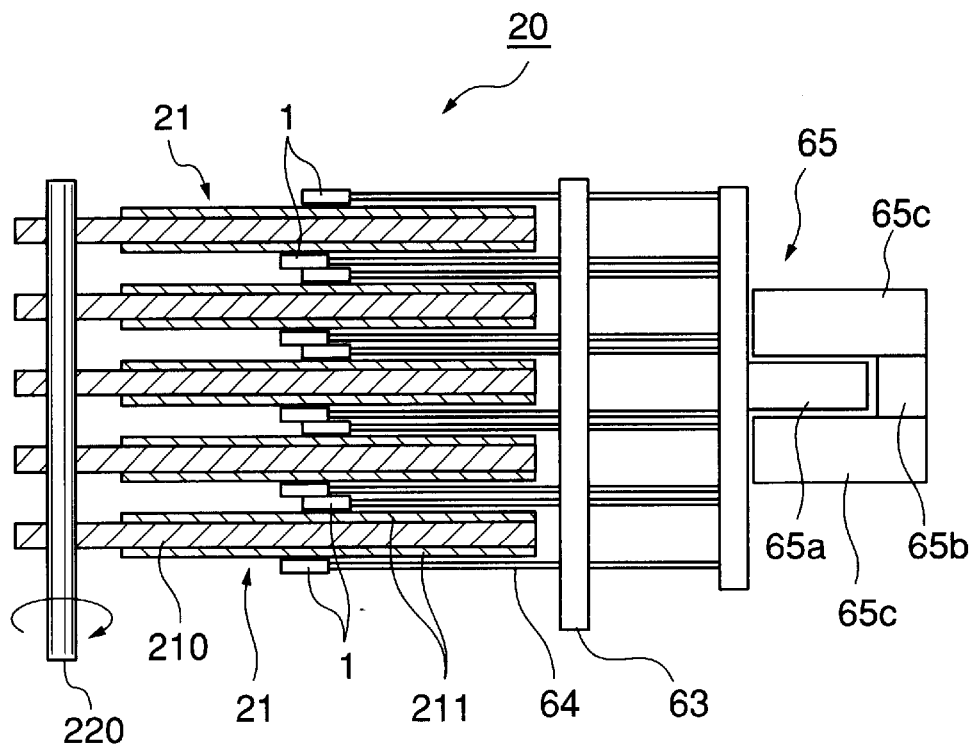
FIG. 13 illustrate a recording/reproducing disk apparatus in accordance with the seventh embodiment of the present invention.

FIG. 13 shows a recording/reproducing disk apparatus 20 in accordance with the seventh embodiment of the present invention. This recording/reproducing disk apparatus 20 has a structure in which the recording/reproducing head 1 having the transparent condensing medium 6 of the first embodiment is applied to a 5-stack disk type recording/reproducing disk apparatus. The recording/reproducing disk apparatus 20 is provided with five recording/reproducing disks 21, each of which has an aluminum substrate 210 coated with magneto-optic recording layers 211 on the top and bottom surfaces thereof, ten recording/reproducing heads 1 which run flyingly on recording media of recording/reproducing disks 21, suspensions 64 that support the recording/reproducing heads 1 rotatably by means of a rotation shaft 63, and a rotation type linear motor 65 for driving the suspensions 64. The rotation type linear motor 65 is provided with a movable member 65a to which suspensions 64 are connected directly and electromagnets 65c and 65c that are connected together with interposition of a yoke 65b for driving the movable member 65a.

The recording/reproducing head 1 and the suspension 64 have the same structure as those of the fifth embodiment, the beam spot 9a and the magnetic sensor 11 of each recording/reproducing head 1 is set so as to track simultaneously on the same track. The beam spot 9a has the same diameter as that of the fifth embodiment, in the case of the disk diameter of about 3.5 inches the recording capacity is increased to 400 GB.

Figure 14:
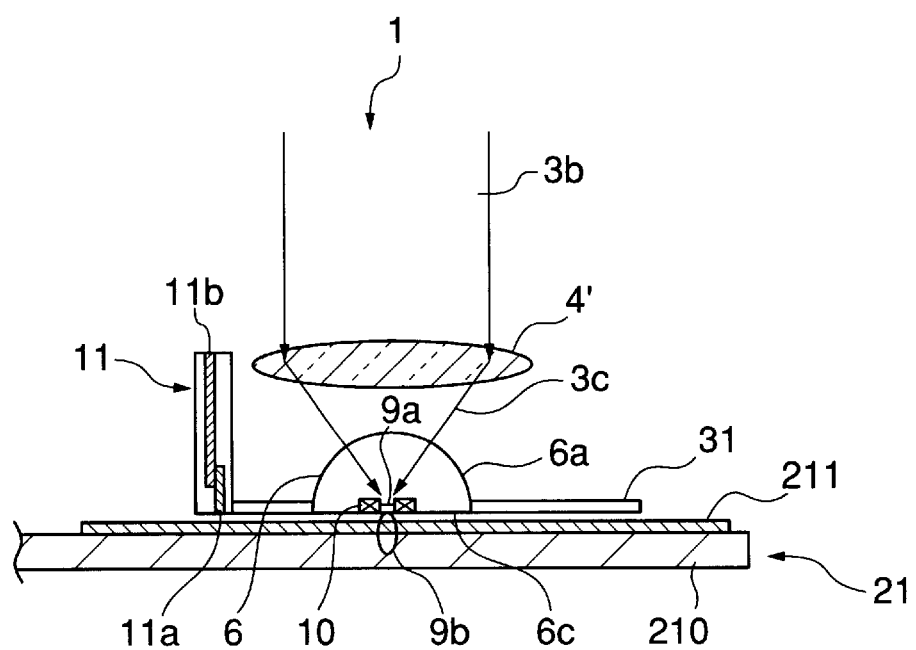
FIG. 14 illustrate a recording/reproducing disk apparatus in accordance with the eighth embodiment of the present invention.

FIG. 14 shows a recording/reproducing disk apparatus 20 in accordance with the eighth embodiment of the present invention. The recording/reproducing disk apparatus 20 has the same structure as that of the fifth embodiment excepting that the optical system of the recording/reproducing head 1 is provided with a condense lens 4' for condensing the laser beam 3a from the semiconductor laser 2 and a semi-spherical transparent condensing medium (SIL) 6 for further condensing the laser beam 3 condensed by the condense lens 4' to form a beam spot 9a. In this case, though the distance between the beam spot 9a and the magnetic sensor 11 is longer than that in the case of the fifth embodiment, and by structuring the swing arm 24 of the recording/reproducing disk apparatus 20 so that the beam spot 9a and the magnetic sensor 11 scan on the same track, the recording density is increased and cost reduction is realized as in the case of the fifth embodiment. The portion of the condense surface 6c on which the beam spot 9a is formed may be projected downward and the coil 10 is provided around the projection. A compact apparatus is thereby realized. The projection may be formed in the shape of taper having a thin bottom end. Thereby, NA can be doubled.

Figure 15A:
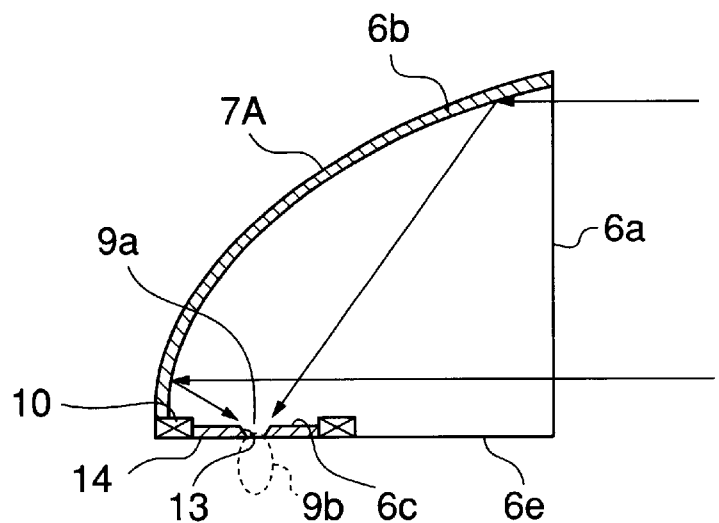
FIG. 15A is a partial cross sectional view of a recording/reproducing head of a modified example.
Figure 15B:
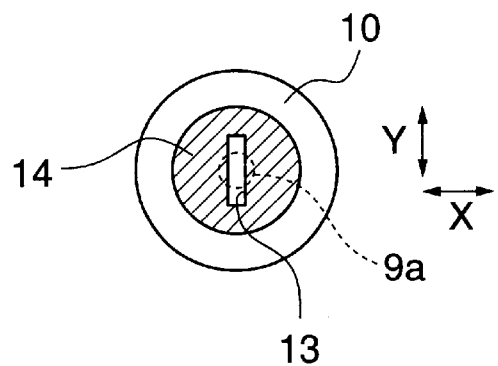

FIG. 15A and FIG. 15B show another embodiment, which is a modified embodiment of the second embodiment. The detail of the shading member 14 in this embodiment is shown. FIG. 15A is a side view, and FIG. 15B is a bottom view. The shading member 14 is formed of highly permeable material such as permalloy. The number of turns of the coil 10 is thereby reduced. As shown in FIG. 15A, the shading member 14 is disposed inside the coil 10 on the surface of the condense surface 6c, and the aperture 13 is formed of taper shape having the thinner end toward the propagation direction of the near field wave. Thereby, the near field wave condensing effect is improved. The aperture 13 of the shading member 14 is formed in the shape of a slit having two facing sides parallel to X-track direction with a length shorter than the diameter of the beam spot 9a and having two facing sides perpendicular to X-track direction namely Y-direction with a length longer than the diameter of the beam spot 9a, as shown in FIG. 15B.

According to the recording/reproducing disk apparatus having the structure described hereinabove, the following effects are obtained:

(a) Because the shading member 14 is formed of highly permeable permalloy, it is possible to reduce the number of turns of the coil 10, and as the result the inductance is reduced, high speed modulation is made possible, and a high transfer rate is realized.

(b) Because the required magnetic filed intensity is obtained, a stable OAM recording is realized.

(c) Because the aperture 13 formed on the shading member 14 limits the irradiation area of the near field wave spot 9b, the minute near field wave spot 9b is obtained, and as the result the recording density is increased.

(d) Because the shading member 14 performs both the reduction of the inductance of the coil 10 and the limitation of the irradiation area of the near field wave spot 9b, the structure is simplified.

(e) Because the shape (rectangular) of the detection unit 11a of the magnetic sensor 11 is about the same as the shape of the recording mark (rectangular) the signal of another recording mark is not detected when the signal is reproduced from one recording mark, and the resolution is improved. Furthermore, because the front of the output signal of the magnetic sensor 11 is symmetrical with the rear of the output signal of the magnetic sensor 11 and the distortion is reduced, the jitter caused during conversion to the digital signal is reduced and the accurate reproduction of the information is realized. As the result, even though the LP-MFM recording system is used, the recording density is increased substantially, and a high transfer rate is realized without increment of the rotation speed of the disk.

(f) Because the head can be made small-sized, high speed tracking is realized.

Figure 16:
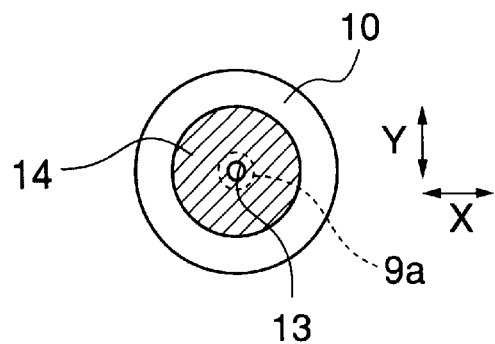
FIG. 16 is a partial bottom view of a recording/reproducing head of another modified example.

The shape of the aperture is not limited to the slit shape, and it may be a minute hole in the form of circular shape or rectangular shape smaller than the diameter of the beam spot 9a as shown in FIG. 16. As the result, it is possible to form the near field wave spot 9b of a small size, and the recording density in X-direction parallel to the track direction and in Y-direction perpendicular to the track direction is increased. In this case, because the beam scanning type semiconductor laser 2 cannot be used unlike in the first embodiment, the recording/reproducing head itself or the transparent condensing medium is driven by use of a piezoelectric element.

This may be applied to optical systems described in other embodiments in which the transparent condensing medium is used.

Figure 17:
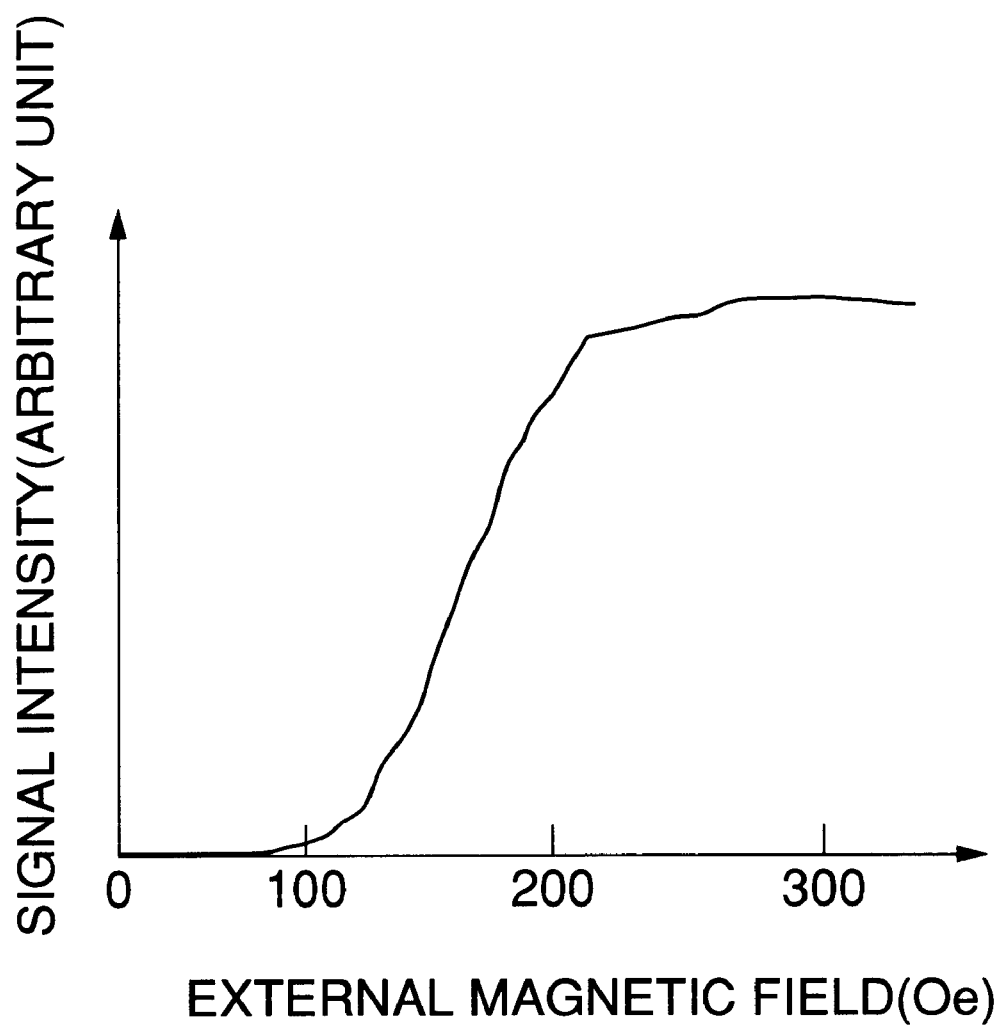
FIG. 17 is a graph showing the relation between the external magnetic field and signal intensity in a magneto-optic recording layer.

FIG. 17 shows the relation between the external magnetic field and the signal intensity in a magneto-optic recording layer. In the case of a recording layer which is a magneto-optic recording layer, the signal intensity from the magneto-optic recording layer rises around 150 (Oe) and begins to saturate around 200 (Oe) as shown in FIG. 17. In this area, however, the recording mark formed does not spread so widely as it covers the entire area heated by the beam spot, and the mark shape is unstable and noise is increased. To stabilize the mark shape, it is desirable to apply a higher magnetic field of about 300 (Oe) as it is understood from FIG. 17.

Figure 18:
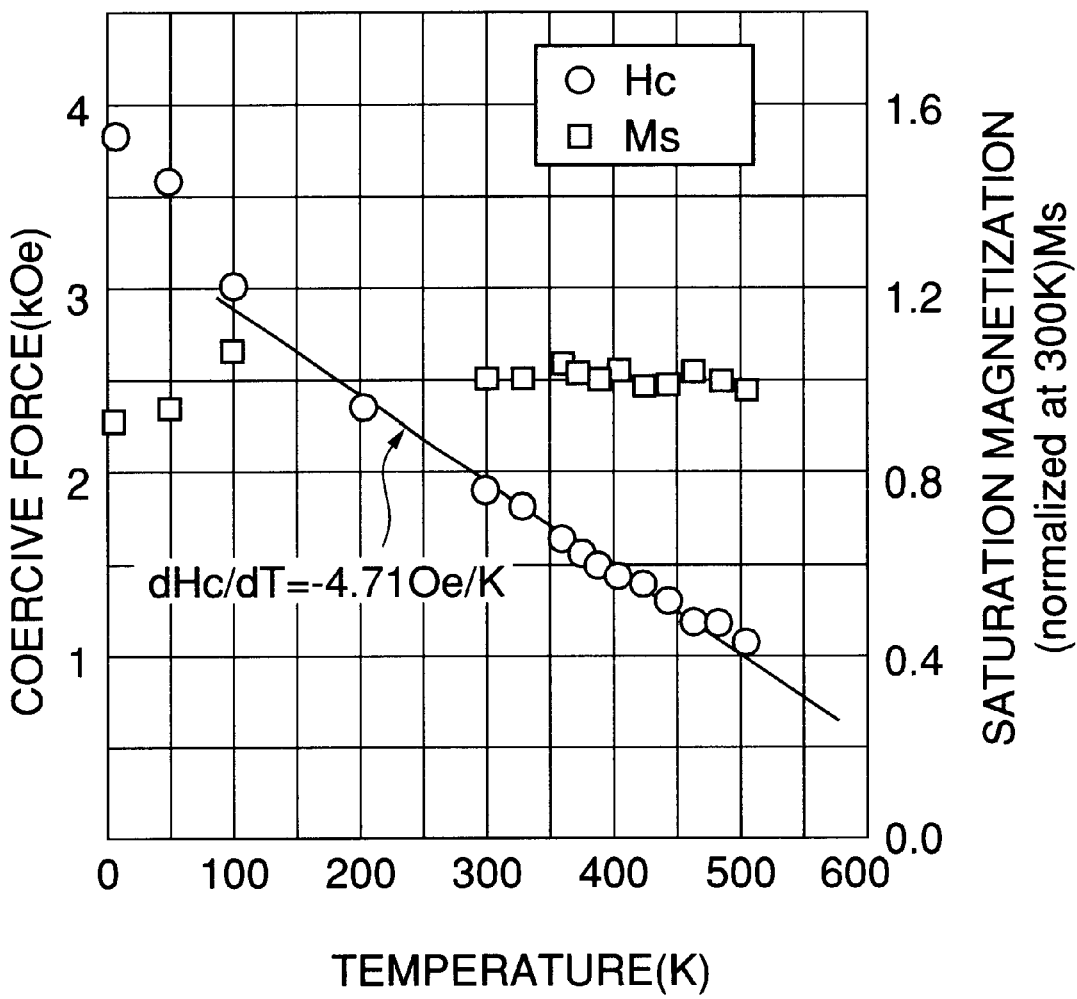
FIG. 18 is a graph showing the relation between the coercive force and the temperature in a magnetic recording layer.

FIG. 18 shows the relation between the coercive force and the temperature of the magnetic recording layer In the case of the recording layer which is a magnetic layer, the data is recorded while the magnetic recording film is being heated and the coercive force is being reduced. Generally, the coercive force of the magnetic film decreases in inversely proportional to the temperature approximately. An example shown in FIG. 18 presents the case of CoPt base magnetic film (IEEE Trans. on Magnetics, Vol. 34 (1998) P. 1600). In this case, the temperature dependency is small in comparison with conventional materials. Such small temperature dependency is advantageous to avoid a super paramagnetic effect due to small magnetic domain resultant from high density. Furthermore, to keep stable recording, it is desirable that the coercive force is several thousands Oe at the room temperature. In this case, the coercive force of several hundreds Oe is residual even if it is heated to a temperature of several hundred degrees as it is understood from the FIG. 18. Therefore, it is desirable that the external magnetic field of at least few hundreds Oe to about 1000 (Oe) is applied in the above-mentioned OAM recording.

First of all, a comparative example is described. The magnetic field intensity of an air-core coil is determined by the outside diameter of the coil, the number of turns, and the current magnitude. A comparative example is described in which a solid immersion lens and an air-core coil are combined and a shading plate is not provided. In the case where a current of about 20 mA is supplied to an air-core coil having a coil outside diameter of about 250 $\mu$m and a coil inside diameter of about 20 $\mu$m with the number of turns of 13, a magnetic field of approximately 150 (Oe) is obtained at the center. It is possible to modulate the magnetic field up to approximately 100 MHz. Though it is possible to increase the current, the current increase is not preferable because the optical system is deformed due to generated Joule heat, and the magnetic field intensity of about 150 to 200 (Oe) is the limit. Though it is possible to increase the number of turns by using a multi-layered coil, it is disadvantageous in that heat dissipation becomes poor and the coil fabrication process becomes complex. In the case of a flat coil described hereinabove, the magnetic field intensity at the center is inversely proportional to the distance to the coil, namely the outside diameter of the coil. However, the wire width should be thinned to decrease the outside diameter of the coil, then the suppliable current decreases concomitantly in proportion to the wire width, as the result the magnetic field intensity cannot be increased substantially even if the coil diameter is made small. Furthermore, because the inductance and resistance of the coil decrease, the modulation rate of the magnetic field is slowed down.

On the reason described hereinabove, though the high density is realized by use of an aperture for forming the near field wave to form a minute beam spot as described hereinabove, the rotation speed is obligedly rather reduced in order to match with the magnetic field modulation rate. In detail, in the case where a 12-cm disk is rotated at a rotation speed of 3600 rpm, the speed is 25 m/s at the outside periphery, and if a mark length of 0.05 $\mu$m is formed, then the maximum transfer rate of 250 MHz would be possible. However, because the modulation speed of the magnetic field is not sufficient for the maximum transfer rate, the rotation speed is obligedly reduced actually. In this connection, the modulation rate of 360 MHz is realized by use of a thin film head having a permalloy magnetic core in HDD.

On the other hand, in the case of parallel recording by use of a multi-laser beam, it is preferable that the beam spot interval is approximately 20 $\mu$m at the condense surface of a solid immersion lens to avoid aberration, and the coil outside diameter of 10 $\mu$m or smaller is required to avoid aberration. As described hereinabove, it is impossible to satisfy all the requirements of the magnetic field intensity and modulation rate, inductance, and outside diameter by use of the air-core coil.

Figure 19:
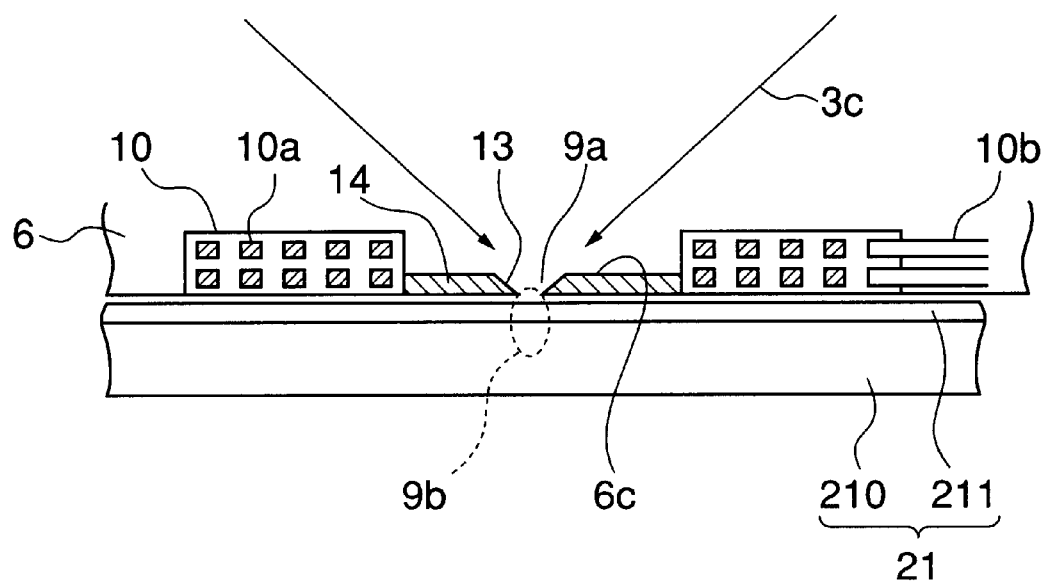
FIG. 19 is a partial cross sectional view of a recording/reproducing head of an example of the present invention.
Figure 20:
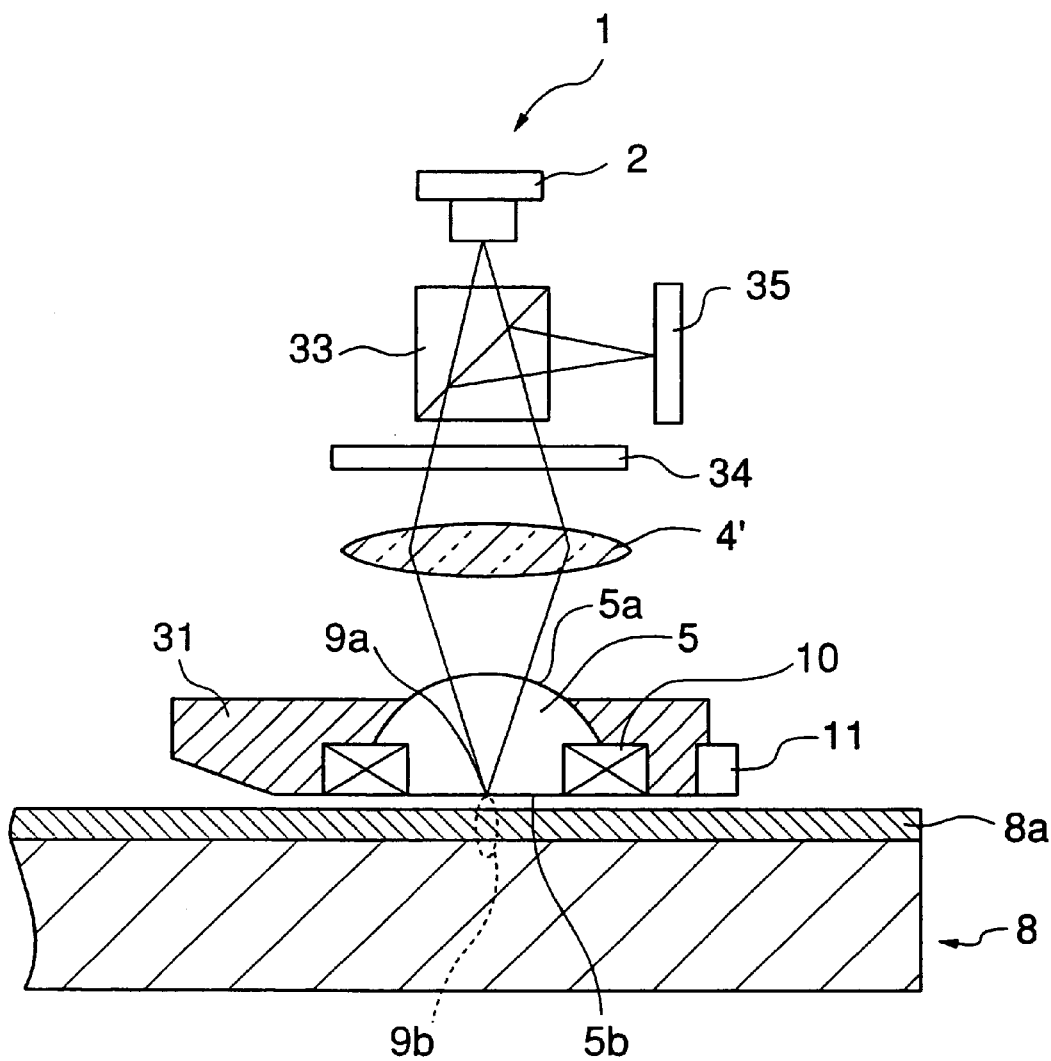
FIG. 20 is a diagram for illustrating a conventional recording/reproducing disk apparatus.

FIG. 19 shows an example of the present invention. The number of layers of the coil 10 is 2 and the total number of turns is 10. The outside and inside diameters of the coil 10 and the wire width of the coil wire 10a are 18 $\mu$m, 4 $\mu$m, and 1 $\mu$m respectively. The coil wire material of the coil wire 10a is aluminum alloy, film is deposited by spattering, and the coil is formed by means of photolithography. Two layers are connected at the center, two lead wires 10b are drawn from one side, and a current is supplied to the lead wires. SiO$_2$ film formed by means of spattering is used for insulation between wires of the coil. In this way, it is possible to supply a current of several mA. A shading member 14 formed of permalloy with a thickness of approximately 0.1 µm having an aperture 13 is provided inside the coil 10. The recording portion of the recording layer namely the position where the near field wave spot is irradiated is located approximately 0.1 µm under the coil center, and the magnetic field intensity of approximately 1000 (Oe) is obtained at the position. Therefore, according to the example, in the case where the recording layer is a magneto-optic recording layer, the required magnetic field intensity of 300 (Oe) or higher is obtained as shown in FIG. 17, and on the other hand in the case where the recording layer is a magnetic recording layer, the magnetic field intensity of several hundreds Oe or higher required for OAM recording is obtained.

The present invention is by no means limited to the abovementioned embodiments, and various modifications may be applied. For example, though a recording/reproducing disk on which an apparatus for a magnetic sensor is not formed is used and a beam spot and magnetic sensor scan on the same track, a structure may be applied in which a recording/reproducing disk on which the tracking marks for a beam spot and the tracking marks for a magnetic sensor are formed is used and a beam spot and a magnetic sensor scan respectively on adjacent tracks located closely.

Alternatively, the address marks may be provided separately. This address marks will not adversely affect the effect of the present embodiment.

An alternative recording/reproducing head may be used which is provided with: a transparent condensing medium having a concave incident surface for diffusing a laser beam emitted from a semiconductor laser, a condense surface located at the position facing to the incident surface on which a beam spot is formed, and a non-spherical reflecting surface formed around the incident surface; a first reflecting film formed on the surface of the reflecting surface of the transparent condensing medium; and a second reflecting film disposed around the position where the beam spot of the condense surface is formed for reflecting the laser beam diffused on the incident surface to reflect on the first reflecting film and to form a beam spot on the condense surface.

What is claimed is:

1. A recording/reproducing head comprising:
    a laser beam emitting unit that emits a laser beam;
    a transparent condensing medium having a first surface which condenses the laser beam emitted from the laser beam emitting unit and a second surface on which the laser beam is condensed by the first surface as a beam spot near an end of the second surface; and
    a magnetic sensor disposed close to the end of the second surface, which detects an incident magnetic field.

2. The recording/reproducing head according to claim 1, wherein the second surface of the transparent condensing medium is provided thereon with a shading film having an aperture that limits the area of the near field wave that leaks from the beam spot.

3. The recording/reproducing head according to claim 2, wherein the aperture of the shading film is smaller than the beam spot.

4. The recording/reproducing head according to claim 2, wherein the aperture of the shading film is a slit having sides longer than the diameter of the beam spot and the other sides shorter than the diameter of the beam spot.

5. The recording/reproducing head according to claim 1, further comprising:
    a coil that applies a magnetic field, disposed near the position on which the beam spot is formed; and
    a shading member having an aperture having a predetermined size disposed on the second surface at the position where the beam spot is to be formed, the shading member being made of highly permeable material.

6. The recording/reproducing head according to claim 5, wherein the shading member is made of permalloy.

7. The recording/reproducing head according to claim 1, further comprising:
    a reflector on the first surface, which reflects the laser beam emitted from the laser beam emitting unit.

8. The recording/reproducing head according to claim 7, wherein the reflector is a metal film.

9. The recording/reproducing head according to claim 7, wherein the first surface of the transparent condensing medium comprises a portion of a paraboloid of revolution.

10. The recording/reproducing head according to claim 7, wherein the first surface of the transparent condensing medium comprises a portion of an ellipsoid of revolution.

11. The recording/reproducing head according to claim 1, wherein the first surface of the transparent condensing medium is provided thereon with a hologram which condenses the laser beam emitted from the laser beam emitting unit.

12. The recording/reproducing head according to claim 11, wherein the hologram is a reflection type hologram that reflects the laser beam emitted from the laser beam emitting unit.

13. The recording/reproducing head according to claim 1, wherein the transparent condensing medium comprises a first transparent medium and a second transparent medium disposed closely together having the approximately same refractive index, the first transparent medium has the first surface, the second transparent medium functions as a flying slider which flies above a recording/reproducing disk by the rotation of the recording/reproducing disk, and the second surface corresponds to the flying slider.

14. The recording/reproducing head according to claim 1, wherein the transparent condensing medium has a refractive index larger than 1.

15. The recording/reproducing head according to claim 1, wherein the width of the detection band of the magnetic sensor is wider than the width of the tracking mark on a recording/reproducing disk.

16. A recording/reproducing disk apparatus having a recording/reproducing head that records information by means of application of a magnetic field and irradiation of a near field wave spot on a recording/reproducing disk and reproduces the information by means of detection of a magnetic field that comes from the recording/reproducing disk, the recording/reproducing head comprising:
    a laser beam emitting unit that emits a laser beam;
    a transparent condensing medium having a first surface which condenses the laser beam emitted from the laser beam emitting unit and a second surface on which the laser beam is condensed by the first surface as a beam spot near an end of the second surface; and
    a magnetic sensor disposed close to the end of the second surface, which detects an incident magnetic field.

17. The recording/reproducing disk apparatus according to claim 16, wherein the second surface of the transparent condensing medium is provided thereon with a shading film having an aperture that limits the size of the near field wave that leaks from the beam spot.

18. The recording/reproducing disk apparatus according to claim 17, wherein the aperture of the shading film has a diameter smaller than that of the beam spot.

19. The recording/reproducing disk apparatus according to claim 17, wherein the aperture of the shading film is a slit having sides longer than the diameter of the beam spot and the other sides shorter than the diameter of the beam spot.

20. The recording/reproducing disk apparatus according to claim 16, wherein the recording/reproducing head further comprises:

a coil that applies a magnetic field, disposed near the position on which the beam spot is formed; and a shading member, with an aperture having a predetermined size, disposed on the second surface at the position where the beam spot is to be formed, the shading member being formed of highly permeable material.

21. The recording/reproducing head according to claim 20, wherein the shading member is formed of permalloy.

22. The recording/reproducing disk apparatus having plural recording/reproducing heads that record information by means of application of magnetic fields and irradiation of near field wave spots on recording/reproducing disks disposed coaxially with a predetermined interval and reproduce the information by means of detection of magnetic fields that come from the recording/reproducing disks, each recording/reproducing head comprising:

a laser beam emitting unit that emits a laser beam;

a transparent condensing medium having a first surface which condenses the laser beam emitted from the laser beam emitting unit and a second surface on which the laser beam is condensed by the first surface as a beam spot near an end of the second surface; and a magnetic sensor disposed close to the end of the second surface, which detects an incident magnetic field.

23. A recording/reproducing head comprising:

a laser beam emitting unit that emits a laser beam;

a reflection type condensing medium having a first surface which condenses the laser beam emitted from the laser beam emitting unit and a second surface on which the laser beam is condensed by the first surface as a beam spot near an end of the second surface; and a magnetic sensor disposed close to the end of the second surface, which detects an incident magnetic field.

* * * * *